United States Patent
Zandi

[19]

[11] Patent Number: 5,966,699
[45] Date of Patent: Oct. 12, 1999

[54] SYSTEM AND METHOD FOR CONDUCTING LOAN AUCTION OVER COMPUTER NETWORK

[76] Inventor: Richard Zandi, 34 Ridge Rd., Chappaqua, N.Y. 10515

[21] Appl. No.: 08/730,518

[22] Filed: Oct. 11, 1996

[51] Int. Cl.$^6$ .................................................. G06F 17/60
[52] U.S. Cl. .................................. 705/38; 705/1; 705/35; 705/37; 235/379
[58] Field of Search ................................. 705/38, 1, 35, 705/37; 235/379

[56] References Cited

U.S. PATENT DOCUMENTS

| | | | |
|---|---|---|---|
| 3,697,693 | 10/1972 | Deschenes et al. | 179/2 DP |
| 4,346,442 | 8/1982 | Musmanno | 364/408 |
| 4,376,978 | 3/1983 | Musmanno | 364/408 |
| 4,597,046 | 6/1986 | Musmanno et al. | 364/408 |
| 4,642,767 | 2/1987 | Lerner | 364/406 |
| 4,742,457 | 5/1988 | Leon et al. | 364/408 |
| 4,774,663 | 9/1988 | Musmanno et al. | 364/408 |
| 4,774,664 | 9/1988 | Campbell et al. | 364/408 |
| 4,789,928 | 12/1988 | Fujisaki | 364/401 |
| 4,876,648 | 10/1989 | Lloyd | 364/408 |
| 4,933,842 | 6/1990 | Durbin et al. | 364/408 |
| 4,953,085 | 8/1990 | Atkins | 364/408 |
| 5,025,138 | 6/1991 | Cuervo | 235/379 |
| 5,038,284 | 8/1991 | Kramer | 364/408 |
| 5,083,270 | 1/1992 | Gross et al. | 364/408 |
| 5,220,501 | 6/1993 | Lawlor et al. | 364/408 |
| 5,239,462 | 8/1993 | Jones et al. | 364/408 |
| 5,611,052 | 3/1997 | Dykstra et al. | 395/238 |
| 5,640,569 | 6/1997 | Miller et al. | 395/729 |
| 5,699,527 | 12/1997 | Davidson | 395/238 |

*Primary Examiner*—Allen R. MacDonald
*Assistant Examiner*—Hani M. Kazimi

[57] ABSTRACT

A computer system for conducting an electronic loan auction over a computer network such as the Internet. The computer system includes a computer connected to the Internet, which performs the following functions: (1) receiving an electronic loan application form from a prospective borrower; (2) providing such application to a loan authorizer's computer over the computer network for approval; (3) receiving an electronic message from the loan authorizer's computer indicating whether or not such loan has been approved; (4) entering the loan application into a database that is accessible to lenders via the computer network, if the loan is approved; and (5) maintaining the loan application in the database for a predetermined period time during which lenders may submit bids and the borrower may accept a bid.

15 Claims, 6 Drawing Sheets

SYSTEM AND METHOD FOR CONDUCTING LOAN AUCTION OVER COMPUTER NETWORK

FIELD OF THE INVENTION

The present invention relates to system and method for conducting an electronic loan auction such that a prospective borrower may choose among bids the one that offers the most favorable terms. More particularly, the present invention relates to conducting an electronic loan auction over a computer network, such as the Internet.

BACKGROUND OF THE INVENTION

Traditionally, a person in need of a loan, such as a mortgage, goes to a lending institution, such as a local bank. There he/she is met with a lending officer of the bank who gives an introduction of the loans that are offered by the bank. The prospective borrower will be asked about the amount of the loan he desires and certain preliminary financial information about the borrower (e.g. gross household income). If the lending officer is satisfied with borrower's answer, he will ask the borrower to formally fill out an loan application and submit it to the bank.

The loan application submitted by the prospective borrower will normally be reviewed by the underwriting department of the bank, which qualifies the borrower for the loan. The information contained in the loan application is first checked to see if it is accurate. If the requested loan is a mortgage, a local real property appraiser will be hired to inspect and appraise the property that is to be mortgaged. The underwriting department will then decide, in accordance with lending guidelines of the bank or of a mortgage organization such as FannieMae, whether or not the prospective borrower is qualified for the loan. Alternatively, instead of itself qualifying the borrower, the bank may pay a secondary mortgage underwriter, such as FannieMae, to qualify a prospective borrower.

A loan is granted to the prospective borrower if the bank determines, in accordance with the above-described procedure, that the borrower is qualified. Otherwise, the prospective borrower will be denied of the loan.

In this traditional way of obtaining a mortgage, the choice of lending institutions is rather limited—they are generally located within the community of the borrower. Moreover, in order to compare loans offered by different lending institutions, the borrower needs to individually contact each of the lending institutions. It is preferred that more lending institutions, not limited by their geographical locations, could participate in offering a loan/mortgage to a prospective borrower.

In addition to the traditional way of obtaining a mortgage, borrower may seek the services of a mortgage broker. A mortgage broker assists the borrower in identifying the types of loan best suited to the borrower and the amount of funds required. The mortgage broker then contacts several lenders to establish the current pricing for desired loan, and presents a list of loan options to the borrower. The mortgage broker then assists the borrower in selecting a lender and subsequently applying for the loan.

The drawbacks for obtaining a mortgage through a broker is that (1) a mortgage broker can only contact a limited number of local lenders; (2) mortgage broker service is very time consuming and consequently expensive; (3) dealing with mortgage broker is limited to regular business hours; and (4) quality of mortgage brokers varies.

It is therefore an object of the present invention to provide a system for conducting an electronic loan auction wherein a loan desired by a prospective borrower is auctioned off to a large number of lending institutions; and It is a further object of the present invention that such electronic loan auction be conducted by using a computer network or networks, such as the Internet, which is accessible to a great number of prospective borrowers, as well as a great number of prospective lenders.

SUMMARY OF THE INVENTION

The present invention provides system and method for conducting an electronic loan auction using a computer network or networks.

In accordance with the present invention, a system for conducting an electronic loan auction comprises a computer and at least one computer network connected to the computer. The computer performs the following functions: (1) making available a computer loan application software including a loan application to a prospective borrower over the computer network; (2) receiving the loan application completed by the borrower over the computer network; (3) forwarding the completed application form to a loan authorizer over the computer network; (4) receiving an electronic message from the loan authorizer over the computer network indicating whether or not the requested loan is approved; (5) providing a record of the loan application to a database, if the borrower is approved; and (6) maintaining such record in the database for access by participating lenders for a predetermined period of time, before a bid is accepted.

In a preferred embodiment, the computer is a computer server, and the computer network is the Internet. The server computer is connected, via the Internet, to a borrower computer, a loan authorizer computer, and a plurality of lenders computers. Moreover, a local area network ("LAN") is also connected to the server computer. A plurality of computers are connected to the LAN, which are used to access the server to perform maintenance work thereon or to check the loan auction process.

Alternatively, more than one computer network may be used in the system of the present invention. For example, one computer network, such as the Internet, is used to connect the borrowers computer to the server computer; a proprietary computer network is used to connected the loan authorizer computer to the server, and another proprietary computer network is used to connect the lender computers to the server.

During the loan auction process, a list of available loans and their records are kept open in the database for access by the lenders. Each loan is open for access for a predetermined period of time, such as one week from the day the loan is entered into the database. Preferably, information on the bids submitted for each loan is also included in the database for access by lenders. A participating lender may download the available loan information from the database to its own computer to analyze available loans and bids submitted for the loans. A lender may submit bids for any of the loans listed to the server computer over a computer network, or revise or withdraw from any bids it submitted before they are accepted.

In an alternative embodiment, instead of each individual loan being kept open for bidding for a predetermined period of time, the entire list of loans in the database is open for access by lenders for a single predetermined period of time (e.g. from Monday till the next Sunday), regardless of when the loan is entered into the database.

During the time a loan of a borrower is in the database open for bidding, the borrower may download bidding information on his or her loan including all the bids submitted for the loan from the server computer to his/her own computer over a computer network. The borrower may accept a particular bid by sending an electronic message to the server computer over a computer network. After receiving such message, the server computer sends a message over a computer network to the computer of the lender whose bid has been accepted, and withdraws the loan from the database.

If a borrower does not accept any bid from lenders during the predetermined time, or if no bid is submitted by any lender, the borrower's loan record is withdrawn from the database. To reenter the auction, a borrower may reapply for another loan auction or to request an extension for another predetermined period of time by sending an electronic message to the server computer.

In the preferred embodiment, the server computer further includes a Web site which provides information on the electronic loan auction process and a computer loan application software designed to take a prospective borrower step-by-step through the application process. A prospective borrower interested in participating in the loan auction may download such application software from the server computer to its own computer via the network.

The present invention provides a convenient way for a prospective borrower to obtain various bids for a loan and to choose the one that offers the most favorable terms. It also gives a participating lending institution more lending opportunities, not limited by the physical distance between the borrower and the lender or the proximity of a branch office of the lender to the borrower.

BRIEF DESCRIPTION OF THE DRAWINGS

These and other objects, features and advantages of the invention are more fully set forth in the accompanying Detailed Description in which.

DETAILED DESCRIPTION OF THE INVENTION

The present invention provides system and method for conducting an electronic loan auction. In accordance with the present invention, a prospective borrower of a loan, such as a mortgage, is more likely to obtain the loan at more favorable terms than those he/she would have obtained by traditional ways. The system and method of the present invention offers convenience for both borrowers and lenders—a prospective borrower may apply for a loan auction from a computer connected to a computer network at any location and at any time of the day, and a prospective lender can submit a bid for a loan from a computer over a computer network.

Figure 1:
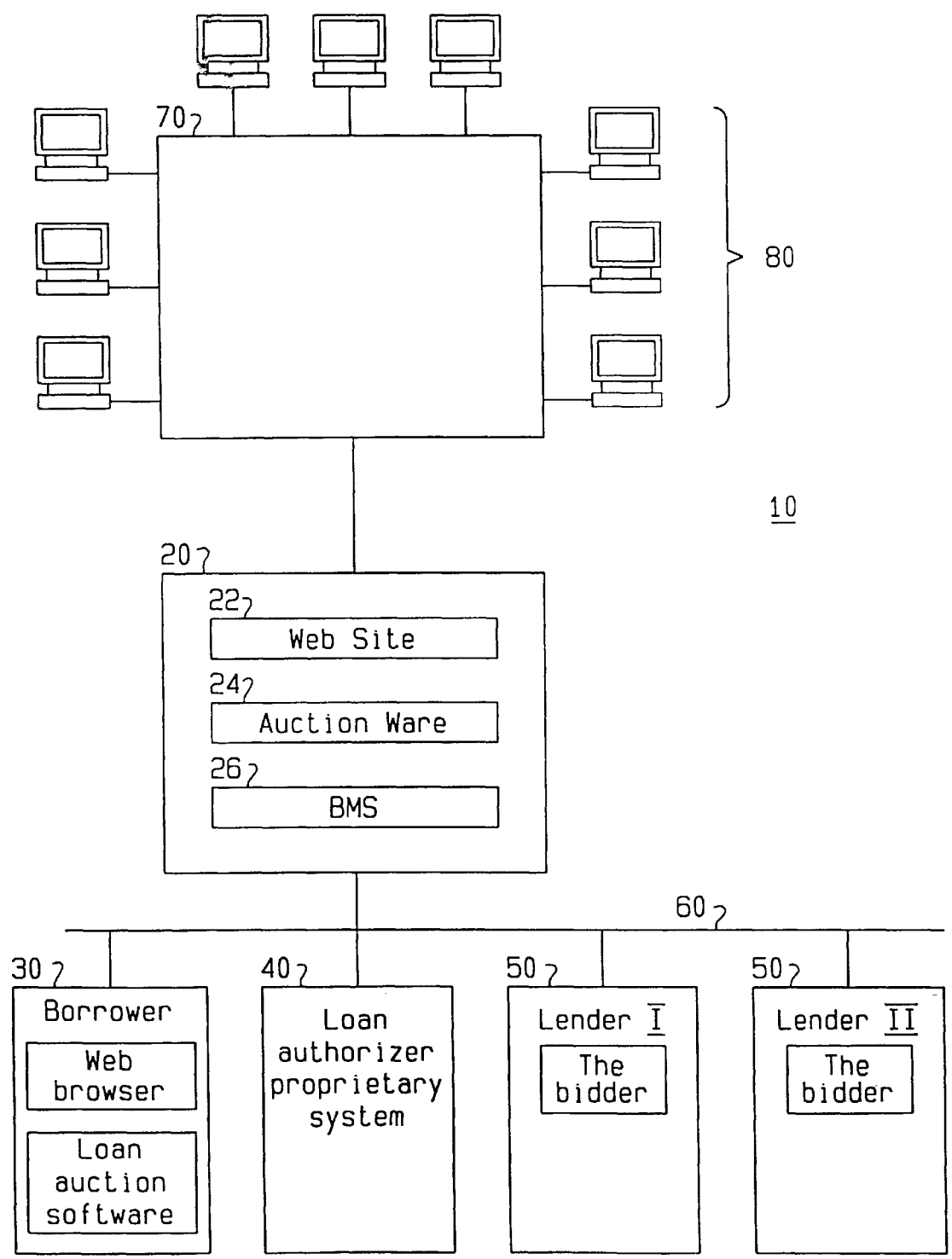
FIG. 1 illustrates a computer system for conducting an electronic loan auction in accordance with the present invention.

FIG. 1 is a block diagram of a computer system 10 of the present invention. Computer system 10 comprises at least one computer 20, preferably a computer workstation. Computer 20 is connected to a borrower computer 30, a loan authorizer computer 40, and a plurality of lenders computers 50, over at least one computer network 60.

Computer 20 is a computer generally known in the field of computers and computer networks as a server computer or computer server. A server computer contains hardware and software adapted to communicate with other computers over a computer network and to make available computer files or software stored in the server computer or a storage device connected thereto such that they can be accessed by a person from another computer connected to the network.

Although one computer server is adequate for the purpose of this invention, to achieve the benefit of redundancy, data security and distributed computing, more than one computer servers is preferred. In a preferred embodiment, the computer system of the present invention includes a plurality of computer servers connected to LAN 70, in place of computer server 20 shown in FIG. 1. For example, one server computer may be dedicated to perform functions of communications with the loan authorizer computer 40; another server computer for communications with lender computers 50; and yet another computer server for communications with borrower computer 30.

Figure 2:
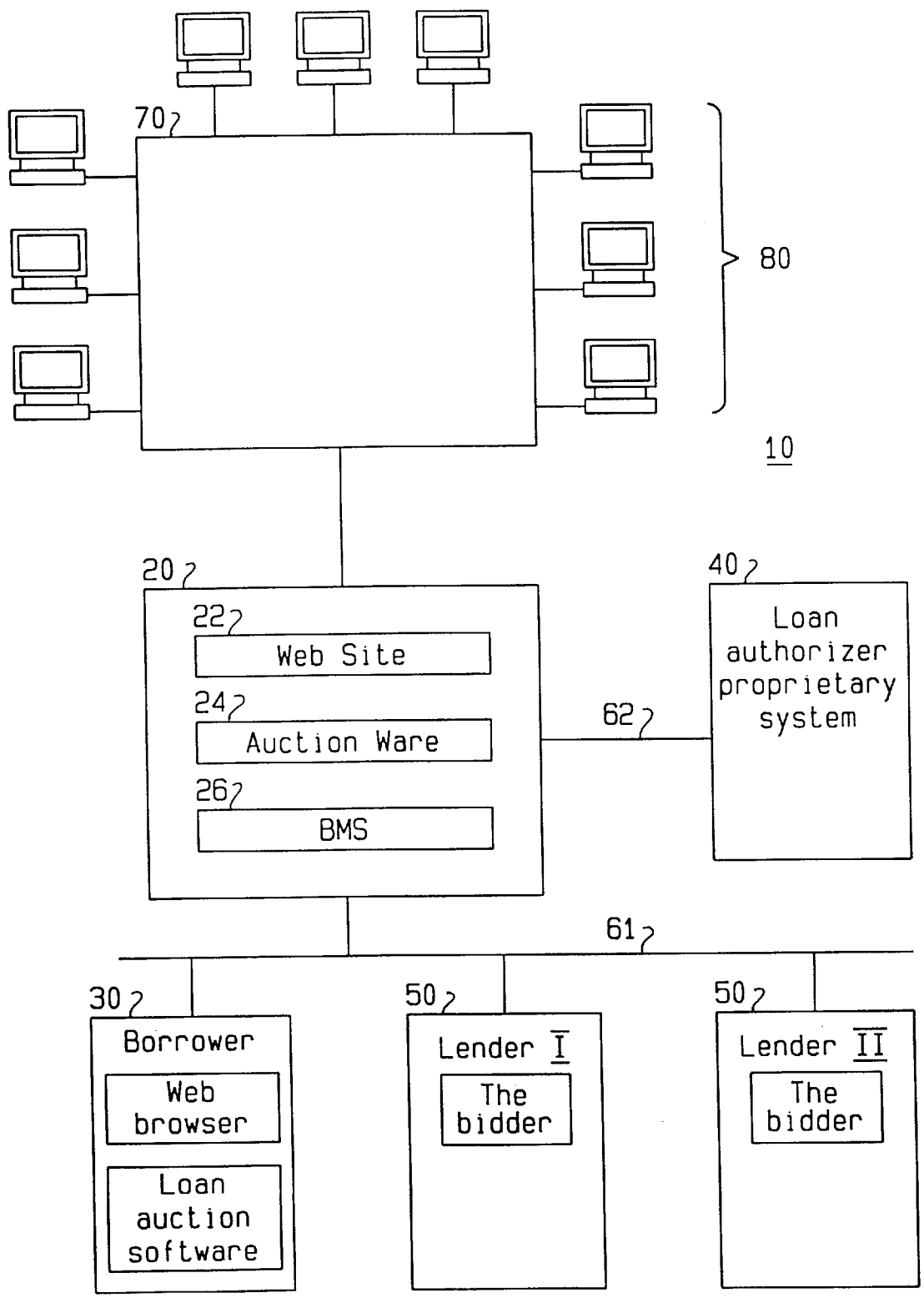
FIG. 2 depicts a preferred embodiment of the present invention.

In a preferred embodiment, more than one computer networks are used. For example, as illustrated in FIG. 2, a computer network 61 connects server computer 20 to borrower computer 30 and lender computers 50, whereas another computer network 62, preferably a secured private computer network, connects server computer 20 to loan authorizer computer 40. For convenience, however, only one computer server 20 is shown in the drawings.

Figure 3:
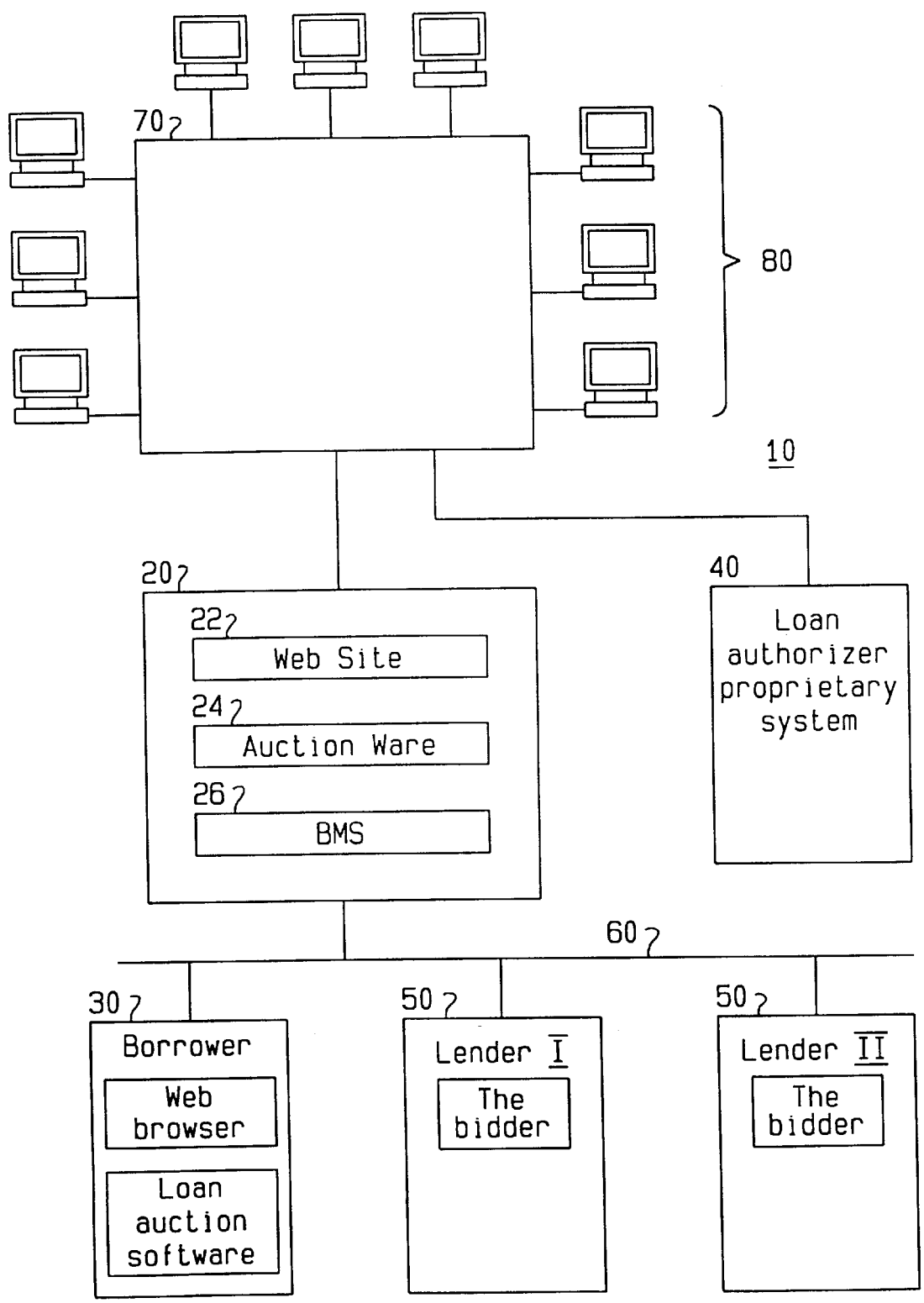
FIG. 3 depicts an alternative embodiment of the present invention.

Referring to FIG. 3, in an alternative embodiment, the loan authorizer computer is connected to server computer 20 via LAN 70, instead of through computer network 60.

Referring again to FIG. 1, in a preferred embodiment, computer 20 is connected to a local area network ("LAN") 70. LAN 70 is connected to a plurality of computers 80. From any one of computers 80, one can access, through LAN 70, computer 20 to work on the software or database contained therein. Live on-line communications can also be carried out between a person at any one of computers 80 on LAN 80 and a person at borrower computer 30, loan authorizer computer 40 or any one of lenders computers 50.

The computer system of the present invention operates as follows:

Computer 20 makes available a computer loan application software ("LAS"), which is downloaded by a prospective borrower at borrower computer 30 through computer network 60. LAS guides the borrower step-by-step to complete an electronic loan application form contained in the LAS and sends it back to computer 20 via computer network 60 (or via computer network 61 depicted in FIG. 2). After receiving the completed electronic application, computer 20 reformats and forwards the loan application to loan authorizer computer 40 over computer network 60 (or computer network 62 depicted in FIG. 2) where it is reviewed by a loan authorizer to see if the borrower is qualified for the loan.

An electronic message indicating whether or not the requested loan is approved is then sent from loan authorizer computer 40 to computer 20 via computer network 60, which is received by computer 20. If the message indicates that the loan has been approved, a record of such loan application is then entered by computer 20 into a database which is accessible by lenders computers 50 through computer network 60.

The loan record is maintained in the database for a predetermined period of time during which the lenders may electronically submit bids for the loan via computer network 60. At any time during this period, a borrower may download a status of his loan auction including bids submitted for the loan onto borrower computer 30 via computer network 60. The borrower may accept any of the bids by sending an electronic message to computer 20 through computer network 60; computer 20 then withdraws the record of the loan application from the database and sends a message to the lender computer whose bid has been accepted; the auction process for the loan is completed.

The loan auction system of the present invention offers many advantages. The auction process is not limited by the physical locations of the lenders or borrowers and as a result, a greater number of lending institutions, as well as borrowers, may participate in the auction. Consequently, a prospective borrower has more opportunities to compare bids and to accept a bid that offers the most favorable terms or is best suited for the borrower's needs.

Lending institutions also benefit from the present invention. In accordance with the present invention, a lending institution may participate in a loan auction even if its office is not geographically close to the prospective borrower. Thus, the present invention provides more opportunities for a lending institution to issue a loan.

The electronic loan auction system of the present invention offers convenience to prospective borrowers—a prospective borrower can apply for a loan at any time of the day or night. In accordance with the present invention, useful information about the loan auction or about loan in general is available from the computer network at any time of the day.

Another advantage of the present invention is that because the loan auction is conducted over a computer network, prospective lending institutions can avoid expensive investment in physical branch offices. By limiting such overhead, lending institutions are better positioned to offer loans at a lower rate, which results in savings for consumers.

The method and system for conducting an electronic loan auction of the present invention will now be described in detail.

FIG. 2 depicts a preferred embodiment of a computer system 10 for conducting an electronic loan auction of the present invention. Computer system 10 comprises a general purpose computer 20 as a server connected to computer networks 61 and 62. Preferably, server computer 20 is a computer workstation, and computer network 61 is the Internet. More preferably, server computer 20 is connected to the Internet 61 via the fastest available connections.

In the preferred embodiment, server computer 20 is connected to a local area network (LAN) 70 which links a plurality of computers 80 to server computer 20. From any of these computers, a person can access server computer 20 to perform maintenance works on the server or other works which will be described in more detail.

Server computer 20 includes: (1) a Web site 22 including a loan application software which can be downloaded to a borrower computer; (2) a computer software 24, designated herein as AuctionWare™, for managing the electronic loan auction; and (3) a computer software 26 called Borrower Management Systems or BMS. They are described in more detail below.

A. The Web Site

In the preferred embodiment, Web site 22 provides the following information or applications:

(1) A summary of current loan or mortgage environment;

(2) A list of participating lenders;

(3) Description of the types of loans available via the computer loan auction system;

(4) Description of the organization, designated herein as LoanX™, that runs the electronic loan auction and list of benefits and costs for using the loan auction system;

(5) Description of required legal disclosure for using the loan auction system;

(6) Pre-qualification form;

(7) Loan/mortgage facts, questions and answer;

(8) Question and answer chat section;

(9) Loan application software ("LAS");

(10) Technical support for LAS and the Bidder (a computer software program which will be described in detail); and

(11) Advertiser billboard.

The pre-qualification form is a computer application software created for a prospective borrower to pre-qualify himself. It can be downloaded by a prospective borrower to his/her own computer 30 via network 61. The pre-qualification form notifies the prospective borrower, after he/she fills out the pre-qualification form, if he/she is too far from qualifying for a loan or mortgage that he desires.

If that is the case, the prospective borrower is persuaded not to proceed any further with the loan application.

Application (8) (Question and answer chat section) allows a prospective borrower to have live on-line communications with a person at computers 80 who is responsible for answering customer questions. By this way, prospective borrowers get immediate response to their questions regarding the loan auction.

B. Loan Application Software ("LAS")

Designed to be directly downloaded by a prospective borrower from the Web site to his/her own computer, LAS is to be used by the prospective borrower to electronically apply for a loan/mortgage. Preferably, major features of LAS include:

(1) Loan/mortgage tutorial;

(2) Loan product selection advisor based on borrowers' needs and preferences;

(3) Financial projection and scenario analysis tools;

(4) Interactive loan application;

(5) Loan approval screening and early identification of problems areas with strategies for dealing ith the problems;

(6) Electronic submission of the loan application;

(7) Documentation check list;

(8) Download lender bids; and (9) Analysis of loan offers including reports, graphics and ranking based on certain criteria.

To apply for a loan, a prospective borrower downloads a copy of LAS from Web Site 22 residing on server computer 20 to borrower computer 30. After filling out an electronic loan application in accordance with feature (4) of LAS listed above, the prospective borrower then electronically submits the complete application to server computer 20 over computer network 61 by using feature (6) of LAS.

Feature (7) provides a list of hard copy documentation, if any, that a prospective borrower is required to submit to the loan authorizer. These documents are used to verify the information contained in the electronic application.

Preferably, versions of LAS are provided that operate on a variety of platforms and operating systems, such as IBM PC compatible computers running the Window 3.1 and Windows 95 operating systems or Apple Macintosh computers.

C. AuctionWare

Residing on server computer 20, AuctionWare is a client/server database application which is used to manage the electronic loan auction. It makes available to lenders a list of available loans and it makes available to a prospective borrower a list of loan bids submitted for the borrower's loan by lenders.

D. Borrower Management System

Borrower management system is a client/server application residing on server computer 20 and LAN 70. It operates to manage the client database, active loan applications, current status of applications and all transaction accounting functions. It is also responsible for electronically submitting a complete electronic loan application received from a prospective borrower to loan authorizer computer 40 for approval. If the loan application is approved by the loan authorizer, BMS operates to receive an approval notification transmitted from loan authorizer computer 40. It also operates to enter an approved loan application into AuctionWare™.

When a borrower accepts a bid, AuctionWare™ notifies BMS and BMS sends messages to both the borrower and the lender whose bid has been accepted, informing them that the bid has been accepted and the auction for the loan is closed. It also withdraws the loan record from AuctionWare™.

Preferably, each of lenders computers 50 includes an application software, herein designated as The Bidder™, for use by the lenders to participate in the electronic auction. The Bidder works on personal computers or computer workstations. Major features of The Bidder include:

(1) Easy and secure download of available loans from the AuctionWare™ database to lender computers 50;

(2) Report functions to analyze loans and assist in preparation of bids;

(3) Data export for easy integration into any proprietary system used by lenders on its computer; and (4) Easy and quick upload of loan bids.

Preferably, loan authorizer computer 40 contains a software operating to receive an loan application form from server computer 20 and to send an electronic message to server computer 20 indicating whether or not such loan application is approved by the loan authorizer. The software may be a proprietary software developed by the loan authorizer.

Now, the operation of the preferred embodiment depicted in FIG. 2 will be described with reference to the flow chart in FIGS. 4A and 4B.

Before a prospective borrower applies for a loan/mortgage through the auction system, he/she may first visit Web site 22 on server computer 20. Web site 22 describes the loan auction process and provides information about the current mortgage environment. If the prospective borrower is interested to proceed further, he/she may download and fill out the electronic pre-qualification form to see if he/she is in the ball park of their desired loan or mortgage.

Figure 4A:
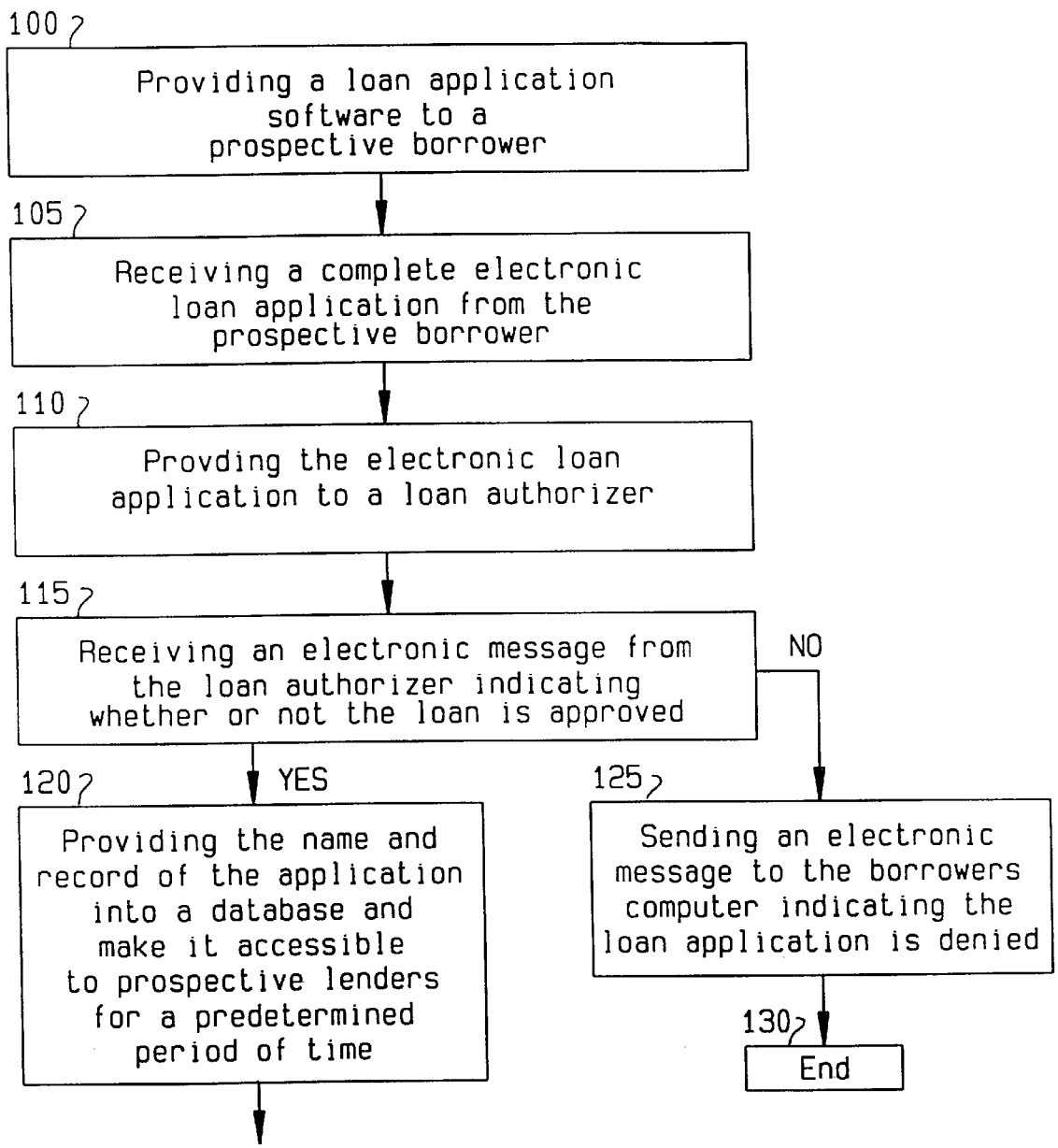
FIGS. 4A and 4B are a flow chart depicting steps for conducting a loan auction over a computer network in accordance with the present invention.
Figure 4B:
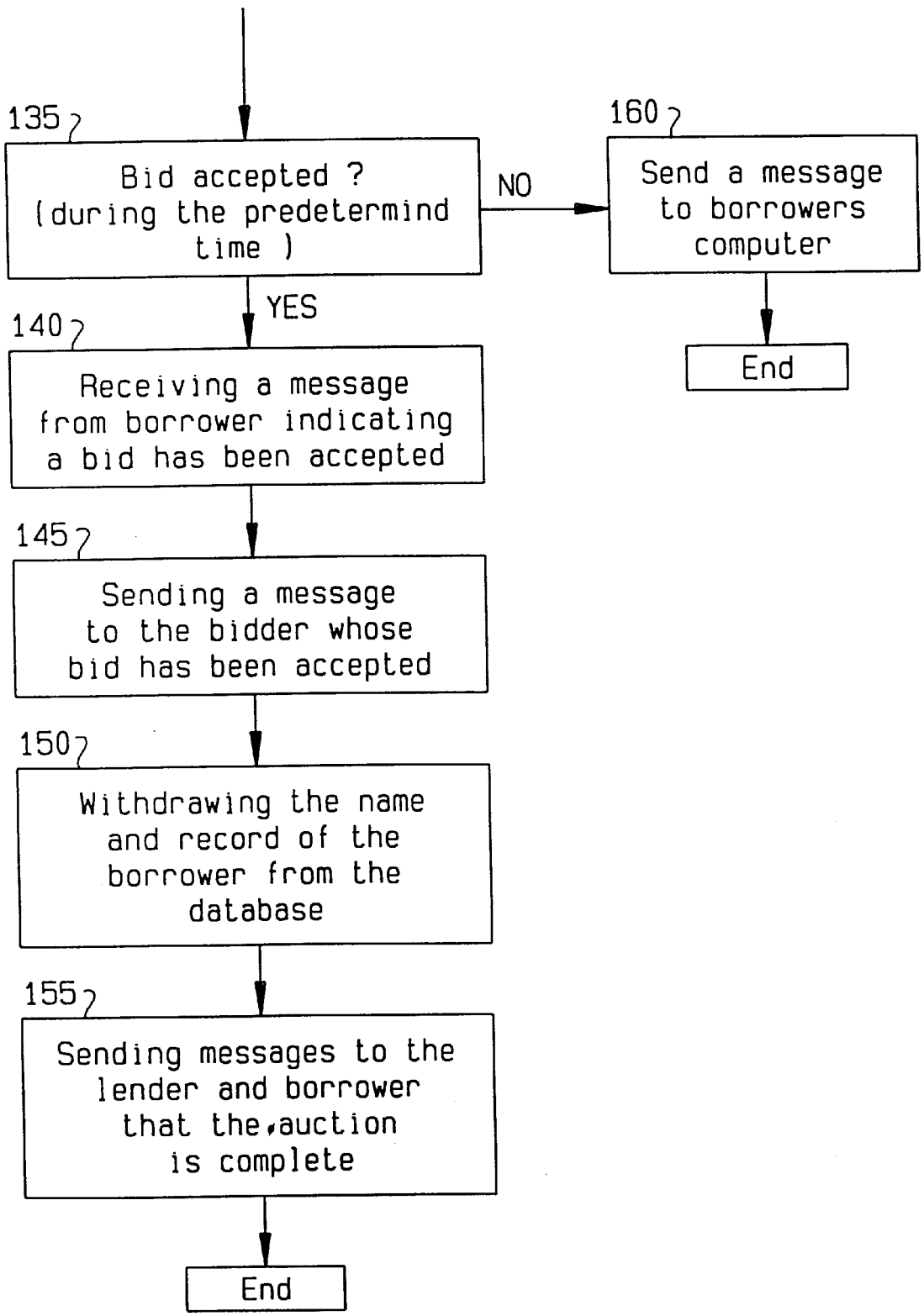

Once the prospective borrower decides to apply for a loan/mortgage, he/she will then download the LAS from the Web site (step 100 in FIG. 4A). Preferably, versions of LAS are available that operate on all major computer operating systems. In a preferred embodiment, LAS is a JAVA (a computer language) application.

LAS has many functions. First, it assists the borrower determine the type (e.g., 30 year fixed rate or 5 year adjustable) and amount of loan required. Next, LAS guides the borrower step-by-step through the loan application. It prompts the borrower for the necessary information and defines, as required, unfamiliar terms. In addition, LAS provides a check list of the various hard copy documents that must be submitted. Preferably, LAS has a screening function designed to identify borrowers that may have a problem qualifying for a particular loan/mortgage and to discourage such problem borrowers from submitting the loan application.

After the loan application is completed, LAS provides instructions to the prospective borrower about the next step in the electronic loan application process. Preferably, LAS also provides an estimate of the borrower's closing cost.

After that, the prospective borrower then submits a completed loan application to server computer 20 via the Internet, using the electronic submission feature of LAS. It should be noted that although the preferred embodiment of the present invention uses the Internet as the computer network for connecting the server computer, borrowers' computer and lender's computers, private networks such as American On-Line can also be used in place of the Internet or in combination thereof. In fact, private computer networks may be more secure at the present time than the Internet. The present invention is not limited to the kind of computer networks used.

The loan application form submitted by the prospective borrower is received by server computer 20 (step 105). After that, the received loan application may be examined by a person at one of computers 80 to make sure that the application is complete and contains no obvious inaccuracies. In a preferred embodiment, instead of a person examining the application, a software program may be used to examine the application.

After the application is deemed to be complete, it is then reformatted and electronically forwarded by BMS to loan authorizer computer 40 via the Internet (step 110). Preferably, the application is in a format acceptable to loan authorizer computer 40. Alternatively, instead of providing the loan application received from borrower's computer to loan authorizer, BMS provides a summary of the loan application to authorizer computer 40.

After a loan authorizer reviews the loan application, an electronic message is sent to computer server 20 via computer network 62 indicating whether the loan/mortgage is approved or denied. In reviewing the loan application, the loan authorizer may purchase a credit analysis of the prospective borrower's credit and to arrange for a property inspection and appraisal if the loan requested is a mortgage.

If more information from the prospective borrower is required, authorizer computer sends a request for more information to computer server 20 which forwards such request to borrower computer 30 via computer network 62.

If the borrower is denied the loan, a message indicating such denial is received by server computer 20 (step 115). The message is then forwarded by the server to borrower's computer 30 (step 125). Preferably, the reason for such denial is also communicated to the borrower.

If the borrower is approved for the loan by the loan authorizer, an electronic message indicating the same is received by computer server 20 (step 115). BMS then provides the borrower's identification and record into AuctionWare™ (step 120).

Once entered into AuctionWare™ for auction, the borrower's identification and record is entered into a database within AuctionWare™ and is held there open to access by lenders for a predetermined period of time (e.g., a week). At any time, a participating lender can log into AuctionWare and download from it a list of available loans and bids submitted for the loans. The list contains a record of each loan including information required by the lender to make an offer (e.g. name of the borrower, type of the loan desired, amount of the loan, and location of the property). Preferably, the record also contains the best current loan offer outstanding for each loan.

The Bidder™ software, located on the lender's computer, is used by a prospective lender to prepare a loan offer and to submit a bid. Preferably, The Bidder™ also includes features which are used by the lenders to analyze and evaluate outstanding loans in the AuctionWare database. Thus, using The Bidder™, a prospective lender downloads a list of outstanding loans, performs financial analyses on the loans, and submits a bid to a particular loan if he desires.

At any time during the auction, the prospective borrower may use LAS to download the current status of his/her loan. The borrower can then use LAS to evaluate the various bids. When the borrower is satisfied with a particular bid, he/she then uses LAS to send an electronic message to AuctionWare™, indicating that he/she accepts it (step 135). After receiving such message (step 140), AuctionWare™ withdraws the name and record of the borrower from the list of outstanding loans from the database (step 150); it sends the lender whose bid has been accepted an electronic message indicating that its bid has been accepted (step 145). At this point, the electronic auction is complete (step 155). The borrower and the lender can then arrange for closing of the loan.

If, after a predetermined period of time for accepting or submitting a bid, no bid is accepted by the borrower or no bid is submitted by any lender, the borrower's name and record will be withdrawn from the database by AuctionWare™ (step 160). To enter into the auction for a second time, the borrower may reapply for the loan auction. Preferably, AuctionWare™ includes a feature to accept an electronic message from the borrower indicating that he/she desires to extend or to relist his/her loan in the auction database for an additional predetermined period of time, and to extend or relist such loan in the database.

In the preferred embodiment, during the auction period, a lender who has submitted a bid uses The Bidder™ to revise and/or withdraw its bid at any time prior to the bid being accepted by the borrower. Similarly, a borrower uses LAS to withdraw from a loan auction prior to accepting any bid.

It should be apparent to one of skill in the art that the system and method of the present invention can be used for auctions of different types of loans, such as, but not limited to, mortgage, home equity loan, car loan, personal loan, commercial loan, construction loan and general business loan.

In another embodiment of the present invention, a computer system for conducting an auction over a computer network comprises at least one computer and one computer network connected to the computer. Means are provided in the computer system to receive an electronic auction request from an offeror over the computer network. Means are also provided to receive a request from a prospective bidder to participate in the auction over the computer network. After receiving the request from the prospective bidder, the computer system of the present invention provides the identification of the prospective bidder to a credit authorizer over the computer network for credit approval. The computer system receives an electronic message from the credit approval authorizer indicating whether or not such prospective bidder is approved to participate in the auction.

To conduct the auction, the computer system of the present invention provides a record of the auction request into a database that is electronically accessible to the prospective bidders approved to participate in the auction by the credit authorizer. The auction request record is maintained in the database for a predetermined period of time during which bids are submitted over the computer network. If the offeror accepts a bid, the auction is closed and the record is withdrawn from the database. The offeror accepts a bid by sending an electronic message over the computer network.

Figure 5:
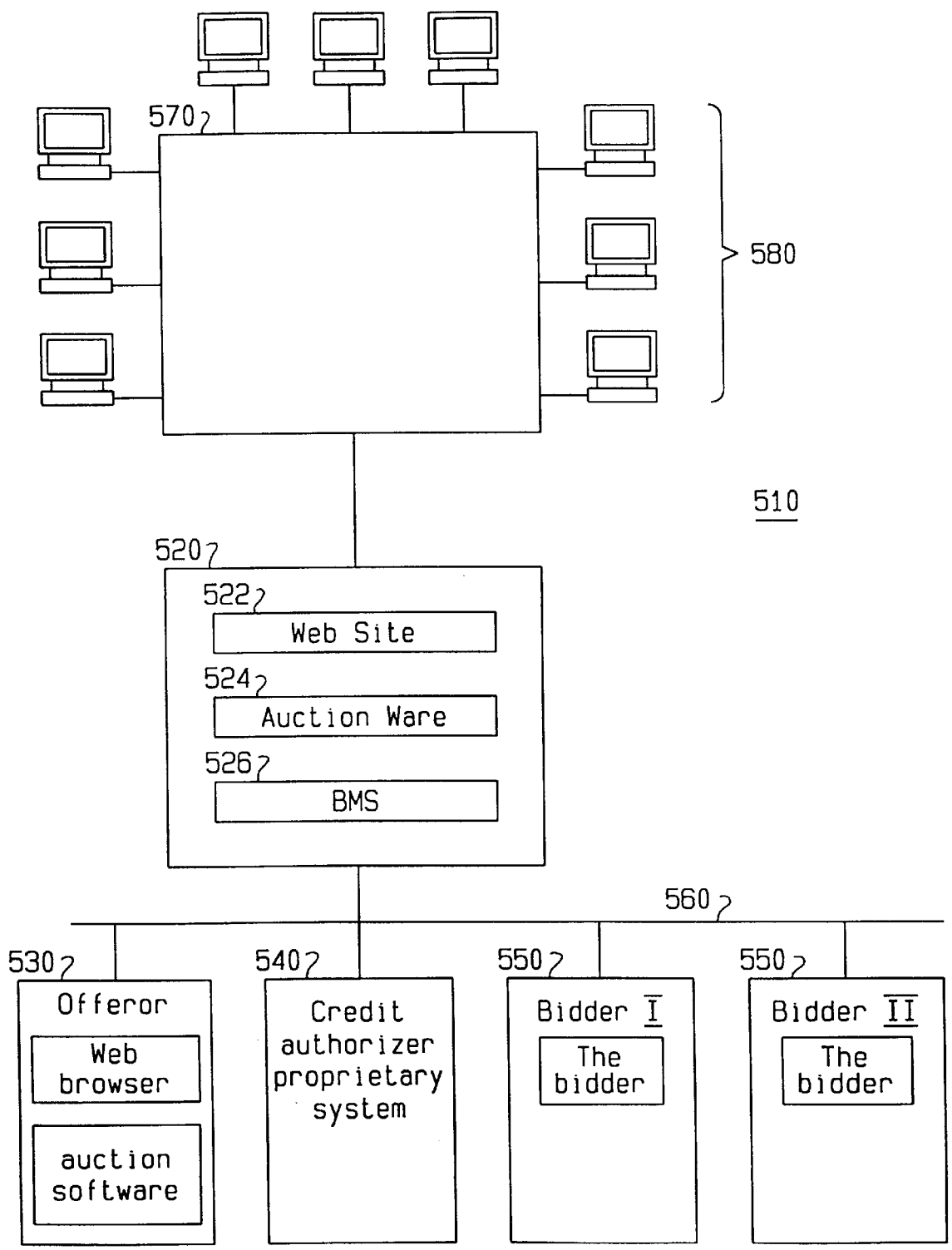
FIG. 5 illustrates another embodiment of the present invention.

Referring to FIG. 5, in a preferred embodiment of the presentation, a computer system 510 comprises a server computer 520 connected to a computer network 560. Connected to computer network 560 are an offeror computer 530, a credit authorizer computer 540, and bidder computers 550.

Computer 520 is connected to a LAN 570. A plurality of computers 580 are connected to LAN 570, which are used to access computer 520.

Computer 520 includes a Web site 522, an AuctionWare™, and BMS. Web site provides a description of the auction process and it contains an auction software for use by offeror (the person offers a thing for auction) and The Bidder™ for use by a bidder, which can be downloaded to offeror computer 530 or bidder computer 550.

Credit authorizer computer 540 is a computer at a credit authorizer, such as a credit approval agency for a credit card company.

In the preferred embodiment, computer system 510 operates as follows:

An offeror who wishes to offer a thing for auction first visits the Web Site and downloads therefrom an auction software. Using the auction software, the offeror prepares a request for auction and sends such request to computer 520 over computer network 560. The request includes the identification of the offeror, the item to be auctioned, a description of the item, and any minimum acceptable bid.

Receiving the auction request from the offeror, computer 50 enters a record of such request into a database that is accessible to approved bidder over computer network 560. The record of request includes information such as a description of the subject of auction, identification of the offeror and any minimum acceptable bid.

The record is maintained in the database for a predetermined period of time (e.g., a week). To participate in the auction, a prospective bidder may first visit the Web Site and download a bidder software, The Bidder™. The Web Site also includes information on available auctions, such as the subjects of auctions and time of the auction. Using the bidder software, a prospective bidder sends a request to participate in the auction over the computer network 560. The request includes identification and method of payment (e.g., the name of a particular credit card company).

After receiving the request from a prospective bidder, computer 520 forwards such request to a credit authorizer, which determines whether or not the prospective bidder is approved to participate in the auction. Information concerning the auction, such as an estimate range of bids, may also be provided to the credit authorizer computer 540 by computer 520 over computer network 560. If the prospective bidder is approved to participate in the auction, an electronic message is sent from credit authorizer computer 540 and received by computer 520. Computer 520 then sends an electronic message to the prospective bidder indicating that he/she has been approved to participate in the auction.

Using the bidder software, the bidder may then submit a bid or download an auction status from the database to his/her own computer.

At any time during the auction, the offeror may accept a bid by sending an electronic message, using the auction software, to computer 520 over computer network 560. After receiving the message, computer 520 withdraws the record of the auction from the database and informs the bidder of such acceptance. The auction process is thus completed. If, after the predetermined period of time, no bid is submitted or no bid is accepted, the auction request record will be withdrawn from the database and the auction is completed.

The claims which follow are to be interpreted to cover all of the equivalent structures and methods. The inventions, thus, not to be limited by the above exemplary disclosure, but only by the following claims.

What is claimed is:

1. A computer system for conducting aloan auction, said computer system comprising:
   (a) at least one computer;
   (b) at least one computer network connected to said computer;
   (c) means for receiving an electronic loan application from a prospective borrower over said at least one computer network;
   (d) means for electronically forwarding loan application information to a loan authorizer over said at least one computer network or another computer network;
   (e) means for receiving form said loan authorizer an electronic message indicating whether or not such loan application is approved;
   (f) means for entering a record of such loan application into a database elecrtonically accessible to a plurality of prospective lenders over said at least one computer network or another computer network, if said message from said loan authorizer indicates that such loan has been approved;
   (g) means for maintaining said record of such loan application in said database accessible to said plurality of prospective lenders for predetermined period of time;
   (h) means for allowing said plurality of prospective lenders to submit bids over said at leasts one computer network on such loan application;
   (i) means for allowing the prospective borrower to access information regarding said bids from said plurality of prospective lenders over said at least one computer network; and
   (j) means for allowing the prospective borrower to accept a bid from said bids of said plurality of prospective lenders over said at least one computer network.

2. The computer system of claim 1 further comprising a local area network ("LAN") connected to said computer, said local area network including a plurality of computers.

3. The computer system of claim 1 further comprising means for providing said electronic loan application from said computer to a computer of a prospective borrower requesting such application.

4. The computer system of claim 1 further comprising means for receiving an electronic message from a prospective borrower's computer indicating that a bid has been accepted by said prospective borrower, and for withdrawing the record of said prospective borrower from said database such that the record is not available to said plurality of prospective lenders anymore.

5. The computer system of claim 1 further comprising means for receiving an electronic message from a borrower's computer and for keeping the name and record of said borrower in said database accessible to said plurality of lenders for another predetermined period of time.

6. The computer system of claim 1 further comprising means for maintaining a status of such loan application in said database accessible to said plurality of prospective lenders for a predetermined period of time.

7. The computer system of claim 6 wherein said status of such loan application includes information on any bids submitted for such loan.

8. Method for conducting a loan auction over a computer system comprising at least one computer and at least one computer network connected thereto, said method comprising the steps of:
   (a) receiving by said computer over said computer network an electronic loan application from a prospective borrower;
   (b) electronically forwarding loan application information to a loan authorizer over said at least one computer network or another computer network;
   (c) receiving from said loan authorizer over said computer network or said another network an electronic message indicating whether or not such loan application is approved;
   (d) entering a record of such loan application into a database that is electronically accessible to a plurality of prospective lenders over said at least one computer network or another computer network, if said message from said loan authorizer indicates that such loan application has been approved;
   (e) maintaining said loan application record in said data base accessible to said plurality of prospective lenders for a predetermined period of time;
   (f) allowing said plurality of prospective lenders to submit bids over said at least one computer network on such loan application;
   (g) allowing the prospective borrower to access information regarding said bids from said plurality of prospective lenders over said at least one computer network; and
   (h) allowing the prospective borrower to accept a bid from said bids of said plurality of prospective lenders over said at least one computer network.

9. The method of claim 8 further comprising, prior to step (a), a step of providing said electronic loan application from said computer to a computer of said prospective borrower.

10. The method of claim 8 further comprising, after step (e), a step of receiving an electronic message from said prospective borrower's computer indicating that a bid has been accepted by said prospective borrower, and withdrawing the record of said prospective borrower from said database such that the record is not available to said plurality of prospective lenders anymore.

11. The method of claim 8 further comprising, after step (e), a step of receiving an electronic message from said borrower's computer and keeping the name and record of said borrower in said database accessible to said plurality of lenders for another predetermined period of time.

12. A computer system for conducting an auction, said computer system comprising:
   (a) at least one computer;
   (b) at least one computer network connected to said computer;

(c) means for receiving an electronic auction request from an offeror over said at least one computer network;

(d) means for receiving a request to participate such auction over said at least one computer network from at least one prospective bidder, the request including an identification of such prospective bidder;

(e) means for providing the identification of such bidder to a credit authorizer over a computer network for credit approval;

(f) means for receiving from said credit authorizer an electronic message indicating whether or not such prospective bidder is approved to participate in the auction;

(g) means for entering a record of such auction into a database that is electronically accessible to the bidders approved by said credit authorizer;

(h) means for maintaining said record of such auction request in said database accessible to the bidders approved by said credit authorizer for a predetermined period of time before a bid is accepted, thereby allowing the bidders approved by the credit authorizer to make bids over said at least one computer network and the offeror to accept a bid over said at least one computer network.

13. Method for conducting an auction using a computer system comprising at least one computer and at least one computer network connected to said computer, said method comprising:

(a) receiving an electronic auction request from an offeror over said at least one computer network;

(b) receiving a request to participate in such auction over said at least one computer network from at least one prospective bidder, the request including an identification of such prospective bidder;

(c) providing the identification of such bidder to credit authorizer over a computer network for credit approval;

(d) receiving from said credit authorizer an electronic message indicating whether or not such prospective bidder is approved to participate in the auction;

(e) entering a record of such request of auction into a database electronically accessible to the bidders approved by said credit authorizer;

(f) maintaining said record of such auction request in said database accessible to the bidders approved by said credit authorizer for a predetermined period of time before a bid is accepted, thereby allowing the bidders approved by the credit authorizer to make bids over said at least one computer network and the offeror to accept a bid over said at least one computer network.

14. A computer system for conducting a loan auction, said computer system comprising:

(a) at least one computer;

(b) at least one computer network connected to said computer;

(c) means for receiving an electronic loan application from a prospective borrower over said at least one computer network;

(d) means for electronically forwarding loan application information to a loan authorizer over said at least one computer network or another computer network;

(e) means for receiving from said loan authorizer an electronic message indicating whether or not such loan application is approved;

(f) means for entering a record of such loan application into a database electronically accessible to a plurality of prospective lenders over said at least one computer network or another computer network, if said message from said loan authorizer indicates that such loan has been approved;

(g) means for maintaining said record of such loan application in said database accessible to said plurality of prospective lenders;

(h) means for allowing said plurality of prospective lenders to submit bids, over said at least one computer network on such loan application;

(i) means for allowing the prospective borrower to access information regarding said bids from said plurality of prospective lenders over said at least one computer network; and (j) means for allowing the prospective borrower to accept a bid from said bids of said plurality of prospective lenders over said at least one computer network.

15. Method for conducting a loan auction over a computer system comprising at least one computer and at least one computer network connected thereto, said method comprising the steps of:

(a) receiving by said computer over said computer network an electronic loan application from a prospective borrower;

(b) electronically forwarding loan application information to a loan authorizer over said at least one computer network or another computer network;

(c) receiving from said loan authorizer over said computer network or said another network an electronic message indicating whether or not such loan application is approved;

(d) entering a record of the such loan application into a database that is electronically accessible to a plurality of prospective lenders over said at least one computer network or another computer network, if said message from said loan authorizer indicates that such loan application has been approved;

(e) maintaining said loan application record in said data base accessible to said plurality of prospective lenders;

(f) allowing said plurality of prosrective lenders to submit bids over said at least one computer network on such loan application in said database;

(g) allowing the prospective borrower to access information regarding said bids from said plurality of prospective lenders over said at least one compute network; and (h) allowing the prospective borrower to accept a bid from said bids of said plurality of prospective lenders over said at least one computer network.

* * * * *